C. E. BURNETT.
SCALE ATTACHMENT FOR SUPPORTING WAGON BEDS.
APPLICATION FILED JAN. 16, 1911.
993,647.
Patented May 30, 1911.
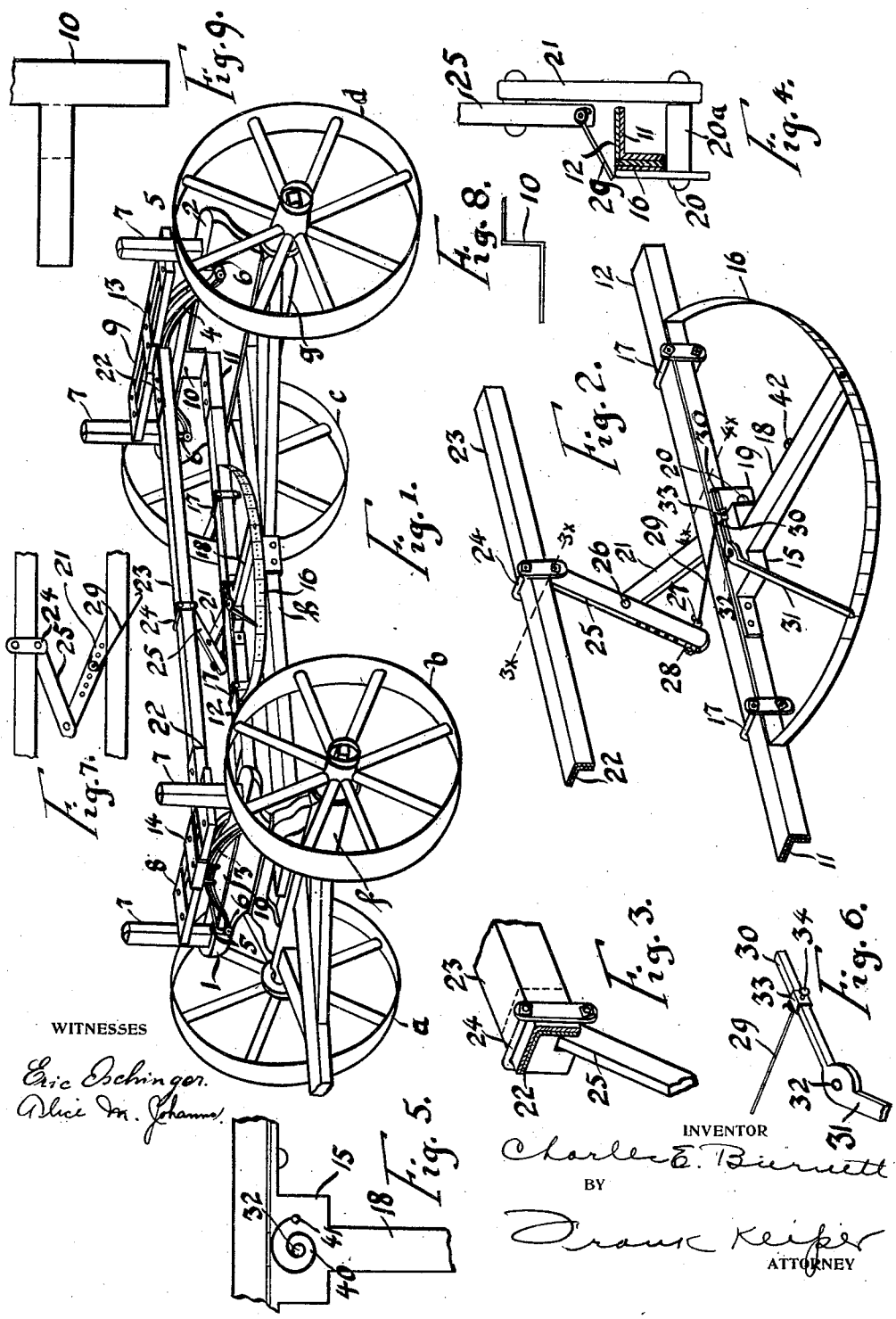

UNITED STATES PATENT OFFICE.

CHARLES E. BURNETT, OF NORTH ROSE, NEW YORK.

SCALE ATTACHMENT FOR SUPPORTING WAGON-BEDS.

993,647.  Specification of Letters Patent.  Patented May 30, 1911.

Application filed January 16, 1911. Serial No. 602,814.

*To all whom it may concern:*

Be it known that I, CHARLES E. BURNETT, a citizen of the United States, residing at North Rose, in the county of Wayne and State of New York, have invented certain new and useful Improvements in Scale Attachments for Supporting Wagon-Beds, of which the following is a specification.

My invention applies to wagons in which springs are interposed between the wagon bed and the running gear thereof in any suitable manner.

The object of my invention is to provide a wagon of such type with a scale or weighing attachment for indicating the weight of the load in the wagon bed.

A further object of my invention is to utilize the springs that are built into the wagon as a part of my scale mechanism, said springs being supplemented with a measuring or indicating device which indicates the compression or flexing of the springs under different loads.

A further object of my invention is to make such scale attachment adjustable so as to fit the running gear of any wagon regardless of its length, and to permit variations in the length of the running gear of any wagon to which it is applied.

Another object of my invention is to make the indicating mechanism readily accessible at the side of the wagon so that the load thereon will be easily visible to anyone standing at the side of the wagon, giving to the driver of the wagon an opportunity to see from the scale mechanism what load is carried in the wagon at the same time that the wagon is being weighed on a platform scales.

It will be understood of course that wagons containing the ordinary run of farm commodities are frequently driven on the platform scales at the elevator or freight depot and are there weighed by the operator of the platform scales. The scale beam of the platform scales is ordinarily within a house by which it and the weighmaster is protected from the weather. The driver ordinarily cannot leave his team and cannot go into the house for the purpose of verifying the weight which is ascertained by the weighmaster, but he can stand by the side of his wagon and read the indication on my improved scale device. It will be understood also that my scale device may indicate on either the right or the left hand side of the wagon, as may be preferred, it being shown in the drawings on the left hand side of the wagon merely as a matter of convenience, it not being thought to involve invention to adapt the mechanism so that it will indicate on the right hand side of the wagon instead.

In the accompanying drawings, Figure 1 represents a perspective view of the running gear of the wagon and my improved scale mechanism thereon, the wagon bed being omitted therefrom for the purpose of clearness. Fig. 2 is a detail perspective view showing on a large scale the indicating mechanism of my invention. Fig. 3 is a perspective view of the parts shown in cross section at $3^x$—$3^x$ in Fig. 2. Fig. 4 is a view on the line $4^x$—$4^x$ in Fig. 2. Fig. 5 is a plan view of the pivot of the indicator and the support therefor, looking at it from below. Fig. 6 is a detail perspective view of the indicator and the link connected thereto. Fig. 7 is a detail view of a modified connection between the two sets of angle irons used for operating the pointer 31. Fig. 8 is a side elevation of the plate 10 ready for use. Fig. 9 is a plan view of the plate 10 before it is bent to the form shown in Fig. 8.

In the accompanying drawings like reference numerals indicate like parts.

In the drawings I have shown the running gear of the wagon comprising the wheels $a$, $b$, $c$ and $d$, mounted on the axles $f$ and $g$, which axles are tied together by the ordinary reach frame $h$. Mounted in the wagon in any suitable manner are provided the bolsters 1 and 2. On either side of the bolster 1 are provided the springs 3, 3, and on either side of the bolster 2 are provided the springs 4, 4. I prefer to use two springs on each bolster although it is obvious that one spring can be used on each bolster instead. On the top of each of the bolsters is a plate or a strap 5 embracing a crank hanger 6, to the outer ends of which are connected the springs 3 and 4. The springs 3 and 4 are the ordinary bow springs. Mounted on each of the bolsters are the upright stakes 7, 7 between which may be placed the bed of the wagon. Between these uprights and mounted on the springs 3 and 4 are the platforms 8 and 9 on which it is intended to rest the bed of the wagon. On top of each of the bolsters is fastened a plate 10, which plate is formed from a sheet metal blank illustrated in plan view in Fig. 7, the plate being bent on the dotted lines illustrated in Fig. 7, and when so bent in section has the outline indicated in Fig. 8. Fastened to these plates 10 are the angle irons 11 and 12. These angle irons extend toward and overlap each other to the extent shown in Fig. 1, and permit of the adjustment thereof so as to increase or decrease the distance between the bolsters 1 and 2 of the wagon frame. On the platforms 8 and 9 are mounted straps 13 and 14 to which in like manner are also connected angles that overlap each other and permit of the same adjustment. I provide a T-shaped casting 15 to which is riveted a semi-circular strap 16. The casting and the strap are fastened to the lower angle irons by the clamps 17. The casting has an arm or brace 18 with which the strap 16 connects and by which it is held rigidly in position. The casting is also provided with a bracket 19 depending therefrom and extending below the angle iron, on which is mounted a pin 20 projecting under the angle iron to the other side thereof. On this pin is a collar 20$^a$ and on the end of the pin is mounted the link 21, said link being pivoted on the pin and held between the end of the collar and the end of the pin in any suitable manner. Mounted on the upper angle irons 22 and 23 is a yoke 24 on the lower side of which is pivotally mounted the link 25. To hold this link in position against the vertical side of the angle iron a block 24' is set in the angle iron at this point, being clamped therein by the yoke 24 which bears on said block. The block is suitably recessed to permit the link 25 to swing freely therein and still hold it in position. Mounted in the link 25 at its lower end is an eye-stud 27, which stud is fastened by nuts 28 at either side of said link, the eye-bolt having a threaded portion of sufficient length to permit adjustment thereof in the link. Connected to the eye-bolt 27 is a rod 29, which in turn is connected to the arm 30 which is a part of the pointer 31, which pointer is pivotally mounted on the brace 18 at 32. The connecting rod 29 is connected to the arm 30 by means of the clamp 33, which is adjustable on the arm 30 and can be fastened in any position by means of the set screw 34. This adjustment is needed to adapt the apparatus to springs of different weight and strength, it being obvious that where the spring is stiff the clamp 33 should be moved toward the pivot 32 to give the arm 31 a long travel around the graduated scale, and where the springs are light and more easily flexed under a load, the clamp 33 should be moved out from the pivot 32 so as to decrease the travel of the pointer 31 around the circular scale.

It will be understood from the showing in Fig. 1 that when the wagon bed rests on the platforms 8 and 9, the springs 3 and 4 would be compressed to a certain extent. It is believed that the flexing or bending of springs of this type would be substantially proportionate to the weight of the load resting thereon, in which case the gradations on the circular scale 16 would be uniform for each ten or one hundred pounds or whatever other unit of measurement might be adopted. If however the compression or bending of the springs would be smaller at heavy loads than it would be at light loads, the graduation of the circular scale 16 would be varied to correspond, it being only necessary to determine that with a given weight the pointer would stand at a given mark on the circular scale 16. When the springs 3 and 4 are compressed, the angle irons 22 and 23 would move toward the angle irons 11 and 12 and would make the links 25 and 21 rock on each other at the joint 26. The free end of the link 25 would through the connecting rod 29 draw on the arm 30 of the pointer 31 and move the pointer 31 around the circular scale 16. When the wagon bed is empty the pointer 31 would point at a certain place on the circular scale, which point would be the zero mark on the scale. This mark can be varied at will by the adjustments at 33 and at 27, these adjustments being provided for the purpose of making the pointer point to the zero mark on the circular scale.

It will of course also be understood that the link 25 is perforated with a series of perforations, in either of which the eye-bolt or eye-stud 27 can be inserted for the purpose of affecting the angular movement of the arm 31 around the scale, which angular movement is also affected by the adjustment of the clamp 33, as above explained. As the load on the wagon increases the upper angle iron will move toward the lower angle iron, due to the compression of the springs 3 and 4, and will draw the pointer 31 around the semi-circular scale accordingly.

To secure a reduced motion of the connecting rod 29 the links 25 and 21 may be constructed as shown in Fig. 7, in which figure the link 21 is shown perforated, permitting a variable engagement of the connecting rod 29 therewith.

It will be understood of course that the circular scale 16 is calibrated by five pounds, fifty pounds, one hundred pounds or any other suitable sub-division, according to the strength and stiffness of the springs 3 and 4. The springs would preferably be of such weight and stiffness as to permit an indication on the circular scale 16 up to five thousand pounds and on a wagon that has been equipped with this apparatus it has been found that while it will weigh up to five thousand pounds, it will also weigh accurately additions to the load as low as five pounds or even lower. It has been found that an addition of one pound to the wagon bed will produce a perceptible movement of the scale pointer.

The pivot of the link 25 must be exactly half way between centers of the springs on the two bolsters. It is apparent that the angle irons 22 and 23 act as an evener between the springs, so that it is not necessary that the weight should be evenly distributed over the two springs, but that the pivot point of the link 25 is compressed substantially the same amount whether each spring is compressed evenly or whether one is compressed considerably more than is the other. The pivot of the link 21 need not be so accurately positioned. The connecting rod 29 can be disengaged from the eye in the clamp 33 so as to throw the pointer 31 out of action when it is not necessary to use the scale. The distance between the bolsters may be increased or decreased by loosening the clamp 24 on the upper set of angle irons and the clamps 17, 17 on the lower set of angle irons, upon which the angle irons may be drawn out on each other or may be pushed in together. When the proper length has been reached the clamp 24 must be again set with its pivot exactly half way between centers of the springs 3 and 4 and the two bolsters and the clamps 17, 17 must also be tightened on the lower angle irons to hold them in adjustment as well. The angle irons 22 and 23 are mounted so as to lie normally somewhat below the upper side of the platforms 8 and 9 on which the bed of the wagon must rest. This is made necessary by reason of the fact that cross bars ordinarily extend under the wagon bed and these cross bars must clear the top angle irons, which result can only be secured by placing the angle irons 22 and 23 down to a corresponding extent. The lower angle irons 11 and 12 are hung half way down from the bolsters which support them so as to prevent the upper angle irons from contacting with the lower angle irons when the spring is compressed. The pivot 32 of the pointer 31 extends through the casting 15 and has connected thereto at its lower end one end of the spiral spring 40, the other end of which is fastened to a pin 41 in the casting 15, between which the spring is held in place. The spiral spring 40 serves to take up the lost motion between the link 25 and the pointer 31, so that the parts will always move in unison.

When the scale is not in use it is desirable to disengage the connecting rod 29 from the eye-stud 27 and fasten it against movement. For this purpose I provide an eye 42 riveted to the angle 12, with which the hook on the end of the connecting rod may be engaged for the purpose of holding it in place when so disengaged.

It will be understood of course that the scale is to be used only when the wagon is at rest, and while the wagon is traveling the connecting rod 29 may be disengaged from the link 25 so as not to be jarred or shaken as it would be when the wagon is traveling over the ordinary roads.

I have shown my invention in connection with a particular kind of spring, one of such springs being used in connection with each bolster. It is obvious however that my invention is equally applicable to the wagons which have two springs in connection with each bolster, it being necessary merely to connect such springs with the evener to which the angle irons would in turn be connected, or a double set of angle irons could be used at the top, which could be connected in the middle by an evener, to which in turn the link 25 could be connected, all such variations and modifications of my invention being considered as easily within the scope and spirit thereof. It will also be understood that while I have shown angle irons for connecting the front and back portions of the wagon and for supporting the links of the scale mechanism, that any other form of construction that will secure the requisite strength and stiffness and permit of the lineal adjustment as well may be used therefor instead.

Having thus described my invention, what I claim as new and patentable is as follows:

1. The combination of a wagon, running gear therefor, a bolster mounted thereon at each end of the wagon, a spring on each of said bolsters, a rigid connection between said springs, a rigid connection between said bolsters, said connections being independent of the wagon bed, means supported on said rigid connections for indicating the weight supported on said springs and the bending of the springs caused thereby.

2. The combination of a wagon, running gear therefor, a bolster mounted thereon at each end of the wagon, a spring on each of said bolsters, a rigid connection between said springs, a rigid connection between said bolsters, said connections being independent of the wagon bed, means supported on said rigid connections for indicating the weight supported on said springs and the bending of the springs caused thereby, said rigid connections operating as equalizers.

3. The combination in a wagon, running gear therefor, a bolster mounted thereon at each end of the wagon, an angle iron connected rigidly to each of said bolsters and extending therefrom toward the other end of said wagon, said angle irons overlapping each other, means for clamping said angle irons together, springs mounted on said bolsters, similar angle irons connected to said springs, means attached to one of said sets of angle irons for measuring on the other angle iron the bending of said springs.

4. In a scale construction the combination of a pair of rigid supports, a spring mounted on each of said supports, rigid connections between said springs, rigid connections between said supports, said connections being independent of the wagon bed, indicating mechanism carried on said connections for indicating the weight supported by said springs.

5. In a scale construction the combination of a pair of rigid supports, a spring mounted on each of said supports, rigid connections between said springs, rigid connections between said supports, indicating mechanism carried on said connections for indicating the weight supported by said springs, said indicating connections comprising a link pivotally mounted on the rigid connections between said springs, a link pivotally mounted on the rigid connections between said supports, said links being pivotally attached to each other, a connecting rod connected to one of said links, an indicating scale mounted on one of said supports, an indicator pivoted thereon and connected to said connecting rod.

6. In a scale construction, the combination of a pair of rigid supports, a spring mounted on each of said supports, an equalizer between said springs, an equalizer between said supports, said equalizers being independent of the wagon bed, indicating mechanism carried on said equalizers for indicating the weight supported by said springs.

7. In a scale construction, the combination of a pair of rigid supports, a spring mounted on each of said supports, an equalizer between said springs, an equalizer between said supports, links pivotally mounted on said equalizers, one of said links being longer than the other and having pivoted thereto the free end of the other link, a connecting rod connected to said link, an indicating scale mounted on one of said supports, an indicator pivoted centrally to said indicating scale and connected to said connecting rod.

8. In a scale construction, the combination of a pair of rigid supports, a spring mounted on each of said supports, an equalizer between said springs, said equalizer consisting of an angle iron rigidly connected to each of said springs and extending toward the other spring, said angle irons overlapping each other, a yoke for clamping said angle irons together, a link pivotally mounted on said yoke, a block clamped in said yoke for holding said link in position.

9. In a scale construction, the combination of a pair of rigid supports, a spring mounted on each of said supports, an equalizer between said springs, an equalizer between said supports, said equalizers being independent of the wagon bed, indicating mechanism carried on said equalizers for indicating the compression or bending of said springs, said indicating mechanism being adjustable to magnify or reduce the indication caused by a given bending of said springs.

10. In a scale construction, the combination of a pair of rigid supports, a spring mounted on each of said supports, an equalizer between said springs, an equalizer between said supports, indicating mechanism carried on said equalizers for indicating the compression or bending of said springs, said indicating mechanism comprising a pair of links, perforations in one of said links, a connecting rod capable at one end of connection to either of said perforations, a pointer pivotally mounted, a crank thereon, said connecting rod being capable of connecting at its other end with said crank, said connection being capable of movement in or out on said crank, to increase or diminish the leverage on said crank and vary the angular movement of said indicator.

11. In a scale construction, the combination of a pair of rigid supports, a spring mounted on each of said supports, an equalizer between said springs, an equalizer between said supports, a T-shaped casting, a semi-circular strap rigidly connected thereto, means for clamping said casting and its strap to one of said equalizers, an indicator pivotally mounted on said casting centrally to said semi-circular strap, a pin mounted on said casting, a link pivotally mounted on said pin, a link pivotally mounted on the other equalizer, and a pivotal connection between said links.

12. In a scale construction, the combination of a pair of rigid supports, a spring mounted on each of said supports, an equalizer between said springs, an equalizer between said supports, a T-shaped casting, a semi-circular strap rigidly connected thereto, means for clamping said casting and its strap to one of said equalizers, an indicator pivotally mounted on said casting centrally to said semi-circular strap, a pin mounted on said casting, a link pivotally mounted on said pin, a link pivotally mounted on the other equalizer, and a pivotal connection between said links, a connecting rod between one of said links and said indicator.

13. In a scale construction, the combination of a pair of rigid supports, a spring mounted on each of said supports, an equalizer between said springs, an equalizer between said supports, a T-shaped casting, a semi-circular strap rigidly connected thereto, means for clamping said casting and its strap to one of said equalizers, an indicator pivotally mounted on said casting centrally to said semi-circular strap, a pin mounted on said casting, a link pivotally mounted on said pin, a link pivotally mounted on the other equalizer, and a pivotal connection between said links, a connecting rod between one of said links and said indicator, a spring mounted on said indicator for taking up the lost motion thereof.

In testimony whereof I affix my signature in presence of two witnesses.

CHARLES E. BURNETT.

Witnesses:
 JOHN C. ALDRICH,
 E. W. CATELEPALL.

---

Copies of this patent may be obtained for five cents each, by addressing the "Commissioner of Patents, Washington, D. C."